Aug. 17, 1965 J. J. AMODEI 3,201,612

STORAGE-DIODE PULSE GENERATOR EMPLOYING TUNING TRANSMISSION LINE FOR ALTERING SHAPE OF OUTPUT PULSES

Filed March 26, 1963 2 Sheets-Sheet 1

INVENTOR.
JUAN J. AMODEI
BY John V. Regan
Attorney

Aug. 17, 1965 J. J. AMODEI 3,201,612
STORAGE-DIODE PULSE GENERATOR EMPLOYING TUNING
TRANSMISSION LINE FOR ALTERING SHAPE
OF OUTPUT PULSES
Filed March 26, 1963
2 Sheets-Sheet 2

INVENTOR.
JUAN J. AMODEI
BY John V. Regan
Attorney

United States Patent Office 3,201,612
Patented Aug. 17, 1965

3,201,612

STORAGE-DIODE PULSE GENERATOR EMPLOYING TUNING TRANSMISSION LINE FOR ALTERING SHAPE OF OUTPUT PULSES

Juan J. Amodei, Levittown, Pa., assignor to Radio Corporation of America, a corporation of Delaware Filed Mar. 26, 1963, Ser. No. 268,196
9 Claims. (Cl. 307—88.5)

This invention relates to pulse generators, and more particularly to tunable pulse generators.

There is a need in many applications for tunable or variable frequency pulse generators. Furthermore, the utility of such pulse generators is greatly enhanced when the waveshape exhibited by the output pulses may be simply changed to any one of a variety of desired shapes.

Accordingly, it is an object of this invention to provide a new and improved tunable pulse generator.

It is another object of this invention to provide a wave shaping circuit for use with a fixed or a variable frequency pulse generator.

It is a further object of this invention to provide a high frequency pulse generator in which the amplitude and the waveshape of the output pulses are easily controlled.

A tunable pulse generator, in accordance with the invention, utilizes charge storage diodes to produce the output pulses. Charge storage diodes are semiconductor devices which exhibit a high conductance to positive signals applied in the forward direction (i.e., from anode to cathode) as well as a high conductance, for a period of time called the storage period, to positive signals applied in the reverse direction (i.e., from cathode to anode). At the end of the storage period, the reverse conductance of a storage diode decays abruptly to the usual low reverse conductance of a semiconductor diode. Thus, the voltage developed across a storage diode exhibits an abrupt change during the decay period.

A control storage diode and an output storage diode, poled in opposite directions, are connected in series across an alternating signal generator, which generator is tunable over a range of frequencies. Alternating signals of a selected frequency which are applied to the serial combination of the storage diodes cause output pulses of the same repetition frequency to be developed across the output storage diode. The control storage diode limits the forward conduction time of the output storage diode to less than one-half of a cycle of the applied alternating signals. This prevents the output diode from remaining in its storage or high conductance period throughout the entire half cycle of reverse conduction. However, it is to be noted that some output storage diodes do not remain in the storage period throughout the entire half cycle of reverse conduction. With such diodes it is not necessary to incorporate a control storage diode in the circuit. The amplitude of the output pulses derived from the output storage diode is substantially equivalent to the instantaneous amplitude of the alternating signals and may be varied by varying the amplitude of the alternating signals.

Further, in accordance with the invention, a wave shaping circuit for high frequency operation of a pulse generator is also provided. High frequency alternating signals are applied to the series combination of said control and output storage diodes through a transmission line, and a stub tuner is coupled across the output storage diode. Pulses developed across the output storage diode are transmitted down the length of the stub tuner and reflected back to the output storage diode. The reflections alter the waveshape of the output pulses and tuning the stub tuner permits the pulses to be varied over a wide range of desired shapes, including pulses which are substantially square as well as pulses which comprise small duty cycle spikes. Again, it is not necessary to incorporate the control storage diode when suitable output storage diodes are obtainable.

The novel features that are considered to be characteristic of this invention are set forth with particularity in the appended claims. The invention itself, however, both as to its organization and method of operation as well as additional objects and advantages thereof, will best be understood from the following description when read in conjunction with the accompanying drawing, in which:

Figure 1:
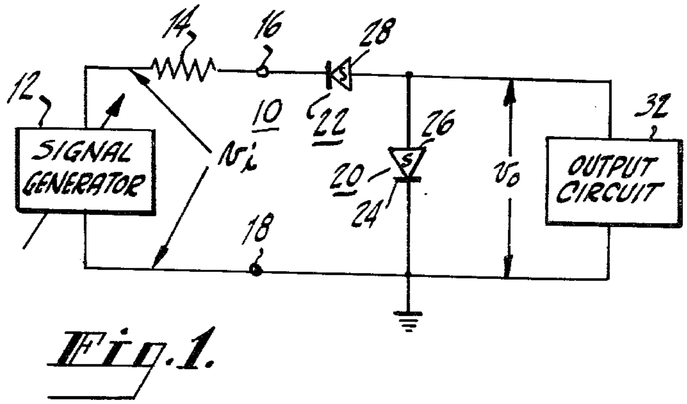
FIGURE 1 is a schematic circuit diagram of an embodiment of a variable frequency pulse generator in accordance with the invention.

Referring now to FIGURE 1, a variable frequency pulse generator 10 includes a signal generator 12 for supplying alternating waves. The alternating waves may, for example, be sinusoidal because of the relative inexpense of sine wave generators, but any suitable alternating wave generator may be utilized. The signal generator 12 is variable both as to amplitude and frequency, as denoted by the arrow drawn therethrough. The signal generator 12 exhibits an internal impedance, as represented by the resistor 14, and includes a pair of output terminals 16 and 18. The impedance 14 of the generator 12 may be augmented by additional external resistance if desired. A pair of oppositely poled charge storage diodes 20 and 22 are serially connected across the generator 12. The cathode 24 of the first or output storage diode 20 is coupled to the output terminal 18 of the signal generator 12, and both are connected to a point of reference potential, or ground, in the circuit. The anode 26 of the first storage diode 20 is coupled to the anode 28 of the second storage diode 22, while the cathode of the second storage diode 22 is directly connected to the output terminal 16 of the signal generator 12. The output pulses generator by the pulse generator 10 are derived from across the first or output storage diode 20 and are applied to an output circuit 32. The output circuit 32 may include a differentiating circuit to differentiate the output pulses.

Storage diodes have been described in the literature; see, for example, an article in the Proc. of the IRE, vol. 50, No. 1, January 1962, pages 43–52, entitled "P–N Junction Charge Storage Diodes," by Moll et al. Storage diodes possess the same high conductance properties as ordinary semiconductor diodes when biased in the forward direction, that is, with the anode of the storage diode positive with respect to the cathode thereof. However, upon being reverse biased, after a period of time under the forward bias condition, the storage diode is unlike the ordinary semiconductor diode in that it exhibits a high conductance in the reverse direction for a period of time called the storage period or recovery time. At the end of the storage period, the storage diode abruptly falls to a low conductance condition. This transition period from the high to low conductance conditions is called the decay period and may, for example, be less than one nanosecond duration. The time duration of the storage period is dependent upon, inter alia, the magnitude and duration of current flow through the diode in the forward direction before it is reverse biased.

Figure 2:
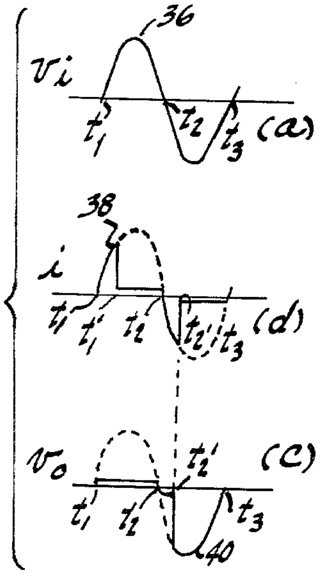
FIGURES 2 and 3 are graphs which illustrate certain operational characteristics of the circuit of FIGURE 1.
Figure 3:
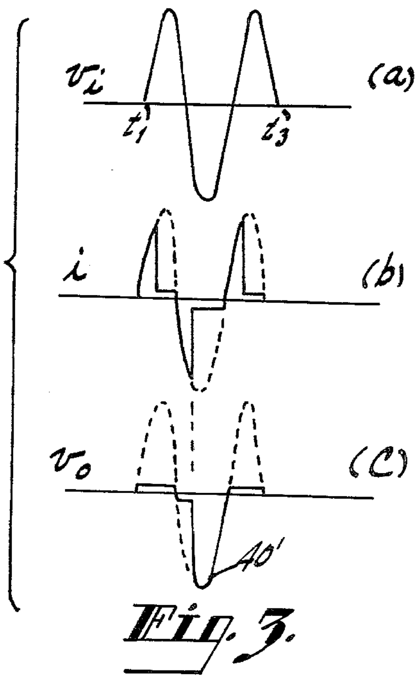

In FIGURES 2 and 3 there are shown a series of graphs illustrating certain operational characteristics of the vairable frequency pulse generator of FIGURE 1. FIGURE 2 illustrates the operation at a selected frequency and amplitude while FIGURE 3 illustrates the operation at a higher frequency and amplitude. One full cycle of the alteranting voltage wave 36 applied from the signal generator is shown in FIGURE 2*a*. The voltage of the curve 36 between the times $t_1$ and $t_2$ is shown as positive-going, while between the times $t_2$ and $t_3$ the voltage is negative-going. Under steady state conditions, the initial portion of the positive half cycle of the voltage wave 36 causes a relatively large current to flow through both the output and control storage diodes 20 and 22. This is shown in FIGURE 2*b* by the portion of the current curve 38 during the time interval $t_1$–$t_1'$. During the time interval $t_1$–$t_1'$, the output storage diode 20 is conducting in the forward direction while the control storage diode 22 is conducting in the reverse direction. The time interval $t_1$–$t_1'$ therefore includes the storage and decay periods for the control storage diode 22.

As the voltage wave 36 from the signal generator 12 continues past the time $t_1'$, which is the end of the storage and decay periods for the control storage diode 22, the current through the diodes 20 and 22 abruptly falls to a low level. Only a small reverse leakage current flows through the control storage diode 22, and hence through the output storage diode 20 between the times $t_1'$ and $t_2$. Thus, the control storage diode 22 limits the forward conduction of the output storage diode 20 to less than a half cycle of the applied alternating signal which in turn limits the storage period of the output diode 20. Very little output voltage is developed across the output storage diode 20 during the time interval $t_1$–$t_2$, as shown in FIGURE 2*c*. This is because both the diodes 20 and 22 are in their high conductance states and exhibit low resistance during the interval $t_1$–$t_1'$, while during the time interval $t_1'$–$t_2$, the control storage diode 22 is in its low conductance, high resistance state and most of the signal generator 12 voltage drops across the diode 22. Therefore, the output storage diode 20 exhibits little output voltage during the entire positive half cycle of the applied voltage signal 36.

When the applied voltage signal 36 goes through its negative half cycle, the output storage diode 20 is reverse biased and the control storage diode 22 is forward biased. The storage period of the output storage diode 20 causes a high current to be passed therethrough during the time interval $t_2$–$t_2'$, which time interval also includes the decay period of the diode 20. The output diode 20 falls to its low conductance state at the time $t_2'$ and remains in this state until time $t_3$. The output voltage wave 40 in FIGURE 2*c* therefore rises from a low level to a high negative level at the time $t_2'$. This abrupt voltage change occurs in an interval which is less than one nanosecond and therefore the output pulse 40 exhibits a fast rise time. After the time $t_2'$, the shape and amplitude of the output voltage pulse 40 follows the instantaneous amplitude of the negative half cycle of the applied voltage wave 36. Thus, the pulse 40 exhibits a slow fall time. A series of negative-going output pulses are produced by the pulse generator 10. The frequency and amplitude of the output pulses 40 correspond to the frequency and amplitude of the applied alternating signal from the signal generator 12. By varying the frequency and amplitude of the signal generator 12, the frequency and amplitude of the output pulses are also varied.

FIGURE 3 illustrates the operational characteristics of the circuit of FIGURE 1 with an applied alternating signal from the signal generator 12 which is at a higher frequency and has a greater amplitude than the applied signal in FIGURE 2. In FIGURE 3*c*, the amplitude of the output pulse 40′ is seen to be appreciably larger and narrower than the pulse 40 in FIGURE 2*c*. Pulses having an amplitude on the order of 20 volts are obtainable from the pulse generator 10 with the limit being the inverse breakdown voltage of the storage diodes 20 and 22. Thus, high amplitude pulses are readily obtainable due to the ease of designing a high amplitude sine wave generator 12.

The frequency or pulse repetition rate of the output pulses is also readily controlled by the frequency of the generator 12. The frequency of the signal generator 12 may in turn be controlled by including therein, for example, a plurality of crystals, one for each desired output frequency, with means for incrementally switching therebetween. Crystal controlled output pulses which may function as accurate timing pulses at any one of a variety of frequencies may therefore be provided by the pulse generator 10.

Pulses of a polarity opposite from the output pulses 40 in FIGURE 2*c* are obtainable from across the control storage diode 22. Similarly, to obtain positive output pulses 40 from the output storage diode 20, the poling of both diodes 20 and 22 should be the reverse of that shown in FIGURE 1.

Figure 4:
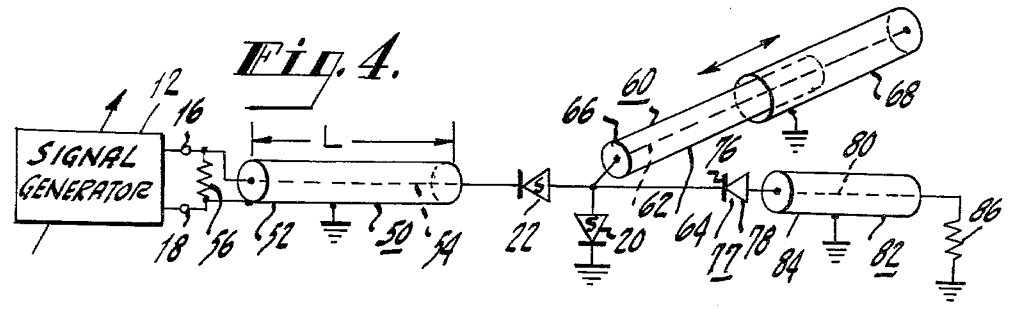
FIGURE 4 is a schematic circuit diagram of a wave shaping circuit for a high frequency pulse generator in accordance with the invention; and, FIGURES 5 and 6 are graphs illustrating the shapes of the pulses generated at various frequencies by the circuit shown in FIGURE 4.

A wave shaping circuit, such as that shown in FIGURE 4, is especially useful at high frequencies to control the waveshape of the output pulses. In FIGURE 4, components corresponding to those in FIGURE 1 are given identical reference numbers. In the circuit of FIGURE 4, high frequency alternating wave energy from the signal generator 12 is applied to the series combination of the output and control storage diodes 20 and 22 through an input transmission line 50 of a fixed length L. The transmission line 50 is illustrated as a coaxial line having an outer conductor 52, which is grounded, and an inner conductor 54 which is insulated from the outer conductor, for example, by spacers of insulating material. Any other type of transmission line, such as, for example, microstrip line, may also be used. A resistor 56 is coupled across the conductors 52 and 54 of the line 50 at the generator 12 end thereof. The resistor 56 is selected to provide at the sending (generator 12) end of the line a line termination matched to the characteristic impedance $Z_0$ of the transmission line 50. The resistor 56 may be a simple resistor or it may be any suitable known isolator. A line isolator may be particularly convenient in those cases where the line 50 is not readily matched by a simple resistor because of a frequency varying internal impedance exhibited by the generator 12, etc. The cathode of the control diode 22 is coupled to the inner conductor 54 of the transmission line 50 while the cathode of the output diode 20 is coupled to the outer conductor 52 thereof. Thus, the receiving end of the transmission line 50 is terminated by the series combination of the storage diodes 20 and 22.

One end of a variable length tuning transmission line, or stub tuner, 60 is coupled across the output storage diode 20. The stub tuner 60 includes an inner conductor 62 connected to the anode of the diode 20 and an outer conductor 64 which is grounded. The stub tuner 60 is composed of a fixed section 66 and a coaxially movable section 68 which is adjustable to vary the length of the tuner 60, as denoted by the double headed arrow in FIGURE 4. The other end of the stub tuner 60 is shown as being open circuited although it may also be short circuited.

The junction of the anodes of the diodes 20 and 22 is coupled to the cathode 76 of an ordinary semiconductor diode 77, while the anode 78 of the diode 77 is coupled to the inner conductor 80 of an output transmission line 82. The outer conductor 84 of the output transmission line 82 is grounded. A load, represented by a resistor 86 in FIGURE 4, is coupled across the terminating end of the output transmission line 82. The characteristic impedance of the output transmission line 82 is selected to match the impedance of the load 86.

The storage diodes 20 and 22 and semiconductor diode 77 may be mounted in a microwave T-junction box having coaxial connectors thereon for connection to the transmission lines 50 and 82 and stub tuner 60. Conveniently, the characteristic impedance of the lines 50 and 82 and the stub tuner 60 may all be selected to be 50 ohms.

The high frequency pulse generator of FIGURE 4 produces output pulses having repetition rates in the megacycle range. The waveshape of the output pulses is controlled by varying the length of the stub tuner 60. Thus, initially the signal generator 12 causes sine wave energy to be propagated down the length L of the transmission line 50 to the series combination of the diodes 20 and 22. The arrival of the sine wave energy at the terminating end of the line 50 causes output pulses to be produced across the output storage diode 20, similar to the pulse 40 in FIGURE 2*c*. The nonlinear and time varying impedance presented by the storage diodes 20 and 22 to the transmission line 50 provides a mismatch which causes the output pulses to be reflected back to the generator end 12 of the line 50. The reflected pulses are dissipated in the matched impedance 56. Thus, substantially no reflections of pulses occur at the generator 12 end of the line 50. Simultaneously, the output pulses produced by the output storage diode 20 are also transmitted down the stub tuner 60. The open circuited termination of the stub tuner 60 causes the output pulses to be reflected in the same polarity back to the diode 20 are sending end of the stub tuner 60. It is to be noted that a short circuit at the end of the stub tuner 60 would also reflect these pulses but in the opposite polarity. The reflected pulses alter the waveshape of the output pulses and, under steady state conditions, produce output pulses having a constant waveshape for a selected length of the stub tuner 60. While the exact theory of the altering of thee waveshape of the pulses initially generated by the storage diode 20 has not been derived, such alterations are believed to be due to a combination of factors. The length of the stub tuner 60 determines the phase of the reflected pulses and thus components are added to and/or subtracted from the initially generated pulses. Additionally, and perhaps more importantly, the phasing of the reflected pulses varies the storage period as well as the high conduction intervals of the storage diode 20 which in turn vary the shape of the output pulses. Thus, a large variety of waveshapes are possible.

The negative output pulses developed across the storage diode 20 are injected into the output transmission line 82 by the diode 77 and transmitted to the matched terminating load 85. The poling of the diode 77 prevents positive ripple waves from being transmitted to the output line 82. Thus, high frequency negative output pulses are applied to the load 85. High frequency positive output pulses could, of course, be derived from the circuit of FIGURE 4 by simply reversing the poling of all the diodes 20, 22 and 77.

Although desirable, it is not necessary that the generator 12 end of the input line 50 be terminated in the matched impedance 56. A mismatched impedance, such as an inductive termination, can also be utilized to couple wave energy from the generator 12 to the input line 50. Such an inductor may appear as a short circuit to the input line 50 when looking back from the diode 20–22 end of the line. Such an impedance causes reflections and also alters the waveshape of the output pulses in a manner similar to the stub tuner 60. However, the stub tuner provides an easy control of the waveshape of the output pulses.

Furthermore, as mentioned previously, the addition of the control storage diode 22 to the circuit of FIGURE 4, or even the circuit of FIGURE 1, is not mandatory. However, the waveshape of the output pulses generated in circuits without the control diode 22 is degraded when compared to the waveshape of the output pulses generated in circuits containing the control storage diode 22.

It is to be noted that the transmission line 50 may be of a fixed length L. If the signal generator 12 is varied to alter the frequency of the output pulses, the stub tuner 60 is also varied to insure that (1) output pulses are produced and (2) the shape of the output pulses is a desired one. For any selected frequency of the signal generator 12, the tuning of the stub tuner 60 from one extreme to the other will cause output waves which vary over a range including no output pulses, then through a wide variety of desired and undesired shapes of output pulses. The range repeats itself again and again depending on the length of the stub tuner 60 and the frequency of the applied signal from the generator 12. For any particular selected frequency of the signal generator 12, the same setting of the stub tuner 60 produces the same shaped output pulses.

The pulse generator of FIGURE 4 produces output pulses having repetition rates which are variable over a wide range of microwave frequencies. The amplitude of the pulses may also be varied by the sine wave generator 12. Thus, at microwave frequencies, at which it is difficult to amplify pulses but relatively easy to amplify single frequency signals, the sine wave output signal from the generator 12 may be amplified to any desired amplitude before application to the input line 50. The amplitude of the output pulses follows the sine wave signal amplitude and thus high power pulses at microwave frequencies are readily produced.

Figure 5:
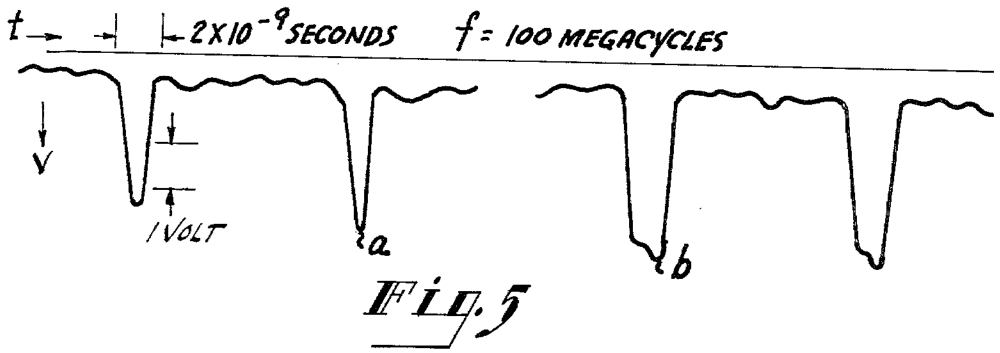
Figure 6:
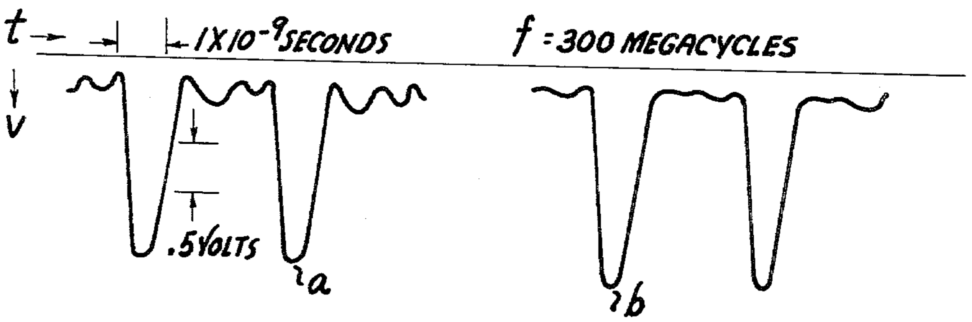

In FIGURES 5 and 6 are shown some of the desired types of waveshapes exhibited by the output pulses at 100 and 300 megacycles, respectively. In FIGURE 5, the pulse repetition rate is 100 megacycles and both narrow spike pulses and substantially square wave pulses are obtained for different settings of the stub tuner 60, as shown in FIGURES 5*a* and 5*b*, respectively. The amplitude and time scales for both figures are shown in FIGURE 5*a*. There are a variety of other shapes that can be produced but those shown illustrate some of the desired waveshapes obtainable.

In FIGURE 6 are shown pulses produced at 300 megacycles. The pulses in FIGURE 6*a* exhibit a base line ripple. The stub tuner 60 was tuned specifically to remove the high frequency base line ripple exhibited by these pulses. The resulting pulses, obtained after tuning the stub tuner 60, are shown in FIGURE 6*b*, and are of the same scale as those in 6*a*. It is to be noted that the pulses in FIGURE 6*b* exhibit relatively minor baseline ripple.

The stub tuner 60 not only may be tuned to alter the waveshape of the output pulses, but can also, under certain conditions, be set to completely cancel every other pulse produced by the storage diode 20. Thus, output pulses at one-half the frequency of the applied signals from the generator 12 may be obtained. The pulses shown in FIGURES 5 and 6 were generated by the circuit of FIGURE 4 wherein the length L of the input line 50 was 18 inches, the storage diodes 20 and 22 were GE type SSD558, the diode 77 was a conventional type MA4121 and the transmission lines 50, 82 and stub tuner 60 all had a characteristic impedance of 50 ohms.

Thus, a pulse generator is provided which exhibits a great flexibility. The frequency, amplitude, and waveshape of the output pulses may be varied over a wide range. High power pulses, which may be accurately and simply controlled, are obtainable to provide timing pulses for data processing and other systems.

What is claimed is:

1. A pulse generator for generating high frequency output pulses comprising in combination, an alternating signal generator, a storage diode, means including a transmission line for coupling said storage diode across said signal generator to generate pulses from said alternating signals, and means including a tuning transmission line coupled across said storage diode to receive and reflect said generated pulses back to said storage diode to control the waveshape of said output pulses.

2. A wave shaping circuit for a high frequency pulse generator comprising in combination, a storage diode, means including a transmission line for applying high frequency alternating signals to said storage diode to derive output pulses therefrom, and a tuning transmission line coupled to said storage diode to alter the waveshape of said output pulses to any one of a variety of waveshapes.

3. A wave shaping circuit for a high frequency pulse generator comprising in combination, a control storage diode and an output storage diode poled in opposite directions and serially connected together, means including a transmission line for applying high frequency alternating signals to the series combination of said diodes to derive output pulses from across said output storage diode, and a tuning transmission line coupled across said storage diode to alter the waveshape of said output pulses to any one of a variety of waveshapes.

4. A wave shaping circuit for a high frequency pulse generator comprising in combination, a transmission line having a sending end and a terminating end, means for applying high frequency alternating wave energy to the sending end of said transmission line, means including a storage diode coupled to terminate said transmission line to produce high frequency output pulses across said storage diode, and a transmission line tuner coupled across said storage diode to alter the waveshape of said output pulses to any one of a variety of desired waveshapes.

5. A wave shaping circuit for a high frequency pulse generator comprising in combination, a transmission line having a sending end and a terminating end, means for applying to the sending end of said transmission line alternating signals of any one of a plurality of high frequencies, first and second storage diodes poled in opposite directions and serially coupled across the terminating end of said transmission line to produce substantially unipolar output pulses, and a stub tuner coupled across one of said diodes to alter the waveshape of said output pulses.

6. A wave shaping circuit for a high frequency pulse generator comprising in combination, a fixed length transmission line having a sending end and a terminating end, means for applying to the sending end of said transmission line alternating signals of any one of a plurality of high frequencies, first and second storage diodes poled in opposite directions and serially coupled across the terminating end of said transmission line to produce substantially unipolar output pulses, a variable length tuning transmission line coupled across one of said diodes to alter the waveshape of said output pulses to any one of a variety of desired waveshapes, and means coupled to said one diode to derive said output pulses, 7. A wave shaping circuit comprising in combination, a fixed length transmission line having a sending end and a terminating end and exhibiting a predetermined characteristic impedance, an impedance substantially equal to said characteristic impedance coupled across the sending end of said transmission line, means for applying to the sending end of said transmission line alternating signals of any one of a plurality of high frequencies, an output storage diode and a control storage diode poled in opposite directions and serially coupled across the terminating end of said transmission line to produce output pulses at said selected one of said high frequencies across said output storage diode, and a stub tuner coupled across said output storage diode to alter the waveshape of said output pulses to any one of a variety of desired waveshapes.

8. A tunable high frequency pulse generator comprising in combination, a transmission line having a sending end and a terminating end and a fixed length, means for applying to the sending end of said transmission line alternating signals of any one of a plurality of frequences, an output and a control storage diode, poled in opposite directions, serially coupled across the terminating end of said transmission line to produce across said output storage diode pulses of said selected frequency, each of said diodes exhibiting a high conductance for alternating waves applied in a forward direction and a high conductance for alternating waves applied in a reverse direction for a storage period, said high conductance in a reverse direction followed by a rapid decay to a low conductance after said storage period, and a variable length tuning transmission line coupled across said output storage diode for altering the shape of the output pulses produced thereacross.

9. A tunable high frequency pulse generator comprising in combination, a fixed length transmission line having a sending end and a terminating end and exhibiting a predetermined characteristic impedance, an impedance substantially equal to said characteristic impedance coupled across the sending end of said transmission line, a variable frequency alternating signal generator tuned to a selected one of a plurality of frequencies coupled to the sending end of said transmission line, an output storage diode and a control storage diode, poled in opposite directions, and serially coupled across the terminating end of said transmission line to produce output pulses at said selected frequency across said output storage diode, a variable length tuning transmission line coupled across said output storage diode and tuned to select a desired waveshape for said output pulses, and means for coupling said output pulses from said output storage diode.

References Cited by the Examiner

UNITED STATES PATENTS 3,089,961 5/63 Overn et al. ---------- 307—88.5

ARTHUR GAUSS, *Primary Examiner.*